United States Patent
McClay et al.

(10) Patent No.: US 12,114,737 B2
(45) Date of Patent: Oct. 15, 2024

(54) FLEXIBLE BUTTON

(71) Applicant: NIKE, Inc., Beaverton, OR (US)

(72) Inventors: Rachel Marie McClay, Portland, OR (US); Luke A. Pezzimenti, Portland, OR (US)

(73) Assignee: NIKE, INC., Beaverton, OR (US)

(*) Notice: Subject to any disclaimer, the term of this patent is extended or adjusted under 35 U.S.C. 154(b) by 497 days.

(21) Appl. No.: 17/407,672

(22) Filed: Aug. 20, 2021

(65) Prior Publication Data

US 2022/0079298 A1 Mar. 17, 2022

Related U.S. Application Data

(60) Provisional application No. 63/079,250, filed on Sep. 16, 2020.

(51) Int. Cl.
*A44B 1/02* (2006.01)
*A44B 1/04* (2006.01)
(Continued)

(52) U.S. Cl.
CPC ............ *A44B 1/02* (2013.01); *A44B 1/04* (2013.01); *A44B 1/08* (2013.01); *A44B 1/20* (2013.01);
(Continued)

(58) Field of Classification Search
CPC .... A44B 1/02; A44B 1/04; A44B 1/08; A44B 1/20; B33Y 80/00; B33Y 10/00;
(Continued)

(56) References Cited

U.S. PATENT DOCUMENTS

D55,037 S       5/1920  Hallauer
1,521,888 A  *  1/1925  Kanoffsky ............... A44B 1/20
                                                24/114.1
(Continued)

FOREIGN PATENT DOCUMENTS

CN    209436389 U    9/2019
DE    1252451       10/1967
(Continued)

OTHER PUBLICATIONS

Enosea, 55 Sets Sew-on Snap Buttons Metal Snap Fastener Durable Press Studs Buttons for Sewing Clothing, 4 Sizes; Available online at: <www.amazon.com>, Jun. 17, 2019, 6 pages.
(Continued)

*Primary Examiner* — David M Upchurch
(74) *Attorney, Agent, or Firm* — Shook, Hardy & Bacon L.L.P.

(57) ABSTRACT

Concepts provided are directed to a flexible button that is bendable when exposed to a force. The flexible button in accordance herein has a tapered perimeter portion such that a thickness of a peripheral edge of the perimeter portion is less than a thickness of remaining portions of the flexible button. The low-profile of the flexible button allows the flexible button to easily slip through a respective button hole and to be more easily gripped by a user. Further, the flexible button in accordance with aspects herein provides higher breathability than conventional buttons of the same size by having voided portions on its perimeter portion.

20 Claims, 6 Drawing Sheets

(51) Int. Cl.
| | |
|---|---|
| *A44B 1/08* | (2006.01) |
| *A44B 1/20* | (2006.01) |
| *B33Y 80/00* | (2015.01) |
| *A44B 1/30* | (2006.01) |
| *B29C 64/153* | (2017.01) |
| *B29K 75/00* | (2006.01) |
| *B29K 105/26* | (2006.01) |
| *B29L 19/00* | (2006.01) |
| *B33Y 10/00* | (2015.01) |

(52) U.S. Cl.
CPC ............ *B33Y 80/00* (2014.12); *B29C 64/153* (2017.08); *B29K 2075/00* (2013.01); *B29K 2105/26* (2013.01); *B29L 2019/00* (2013.01); *B33Y 10/00* (2014.12)

(58) Field of Classification Search
CPC .............. B29C 64/153; B29K 2075/00; B29K 2105/26; B29L 2019/00
See application file for complete search history.

(56) References Cited

U.S. PATENT DOCUMENTS

| | | | |
|---|---|---|---|
| 1,562,724 A | 11/1925 | Redfield | |
| 1,618,398 A | 2/1927 | Winslow | |
| 1,619,541 A | 3/1927 | Rehor | |
| 1,800,767 A * | 4/1931 | White | A44B 1/44 24/95 |
| 2,081,485 A | 5/1937 | Knott | |
| 2,087,074 A * | 7/1937 | Tucker | A44B 1/08 24/114.9 |
| 2,087,470 A * | 7/1937 | Davidson | B29D 19/04 264/161 |
| D106,499 S | 10/1937 | Broder | |
| 2,104,885 A * | 1/1938 | Robbins | A44B 1/28 24/690 |
| 2,110,645 A * | 3/1938 | Carley | A44B 1/20 24/114.7 |
| 2,383,238 A | 8/1945 | Magnus | |
| 2,519,316 A * | 8/1950 | Jones | A44B 17/0082 D11/220 |
| 2,656,541 A | 10/1953 | Beaver et al. | |
| 2,895,199 A * | 7/1959 | Jones | A44B 17/0029 411/339 |
| 3,154,036 A * | 10/1964 | Fimmel | A44B 1/18 112/475.15 |
| 3,378,893 A * | 4/1968 | Labek | A44B 17/0029 24/303 |
| 4,097,969 A * | 7/1978 | Nysten | A44B 1/44 24/103 |
| 4,387,488 A | 6/1983 | Kanzaka | |
| 5,199,136 A * | 4/1993 | McNerney | A47J 36/04 24/114.7 |
| 5,357,659 A | 10/1994 | Ackermann | |
| 6,226,842 B1 * | 5/2001 | Wong | A45C 13/1069 24/66.1 |
| D443,847 S | 6/2001 | Xidarakou | |
| 6,353,978 B1 * | 3/2002 | Kawahara | A44B 17/0035 24/114.4 |
| 6,951,626 B2 | 10/2005 | Akashi | |
| D626,231 S | 10/2010 | Perchik | |
| 9,521,869 B2 | 12/2016 | Weiss et al. | |
| 10,004,299 B2 | 6/2018 | Maussen | |
| 10,287,721 B1 | 5/2019 | Rizzo | |
| 10,453,358 B2 | 10/2019 | Jovanovic | |
| 2002/0010986 A1 * | 1/2002 | Fildan | A41F 15/002 24/689 |
| 2003/0233082 A1 | 12/2003 | Kline et al. | |
| 2006/0007668 A1 * | 1/2006 | Chien | A43B 3/36 362/103 |
| 2010/0199461 A1 * | 8/2010 | Usui | A44B 1/20 112/475.15 |
| 2010/0285283 A1 | 11/2010 | Kingsbury | |
| 2017/0188734 A1 * | 7/2017 | Tong | A44B 1/14 |
| 2017/0258184 A1 * | 9/2017 | Cilman | A44B 1/02 |
| 2017/0367445 A1 * | 12/2017 | Prstojevich | A44B 18/008 |

FOREIGN PATENT DOCUMENTS

| | | |
|---|---|---|
| FR | 707251 | 7/1931 |
| JP | 2007-222527 A | 9/2007 |
| WO | 96/11793 A1 | 4/1996 |
| WO | 2012/014578 A1 | 2/2012 |

OTHER PUBLICATIONS

Gabriel, Wendy, "Nike's Reuse-a-Shoe Program", The in-store drop-off recycling program collects old shoes and turns them into new Nike products & rdquo; Available online at: <www.recyclenation.com>, Aug. 31, 2012, 4 pages.

Richest Pack Limited, Recycled round shape plastic snap button; Available online at: <www.richestpack.com>, Apr. 8, 2020, 7 pages.

International Preliminary Report on Patentability received for PCT Patent Application No. PCT/US2021/047484 mailed on Mar. 30, 2023, 10 pages.

International Search Report and Written Opinion for PCT application No. PCT/US2021/047484, mailed on Dec. 10, 2021, 15 pages.

\* cited by examiner

FLEXIBLE BUTTON

CROSS-REFERENCE TO RELATED APPLICATIONS

This U.S. Non-provisional application Ser. No. 17/407,672 entitled "FLEXIBLE BUTTON," and filed on Aug. 20, 2021, claims the benefit of U.S. Provisional Application No. 63/079,250, entitled "FLEXIBLE BUTTON," and filed on Sep. 16, 2020, which is incorporated by reference in its entirety herein.

TECHNICAL FIELD

Aspects herein relate to a flexible button that is lightweight and breathable. The flexible button, in accordance with aspects herein, may be used, for example, in sports uniforms.

BACKGROUND

Traditionally, buttons are made of a rigid plastic material having a predetermined, uniform overall thickness and lack apertures or voids except for holes used to stitch the button to an article of apparel. The rigid nature of the buttons makes them more likely to tear off when exposed to shearing forces and uncomfortable when positioned under the weight of a wearer, such as during sliding and/or prolonged sitting. Additionally, the lack of apertures or voids contributes to increased weight of the button and may inhibit the breathability features of the underlying textile.

SUMMARY

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are illustrative in nature and are not limiting.

Clause 1. A flexible button comprising: a central portion having two or more threading openings and a first thickness; and a perimeter portion continuously extending from the central portion, wherein a peripheral edge of the perimeter portion is tapered such that a second thickness of the peripheral edge is less than the first thickness of the central portion, and wherein the flexible button comprises a Shore A durometer hardness value from about 80 to about 100.

Clause 2. The flexible button according to clause 1, wherein the flexible button comprises at least 50% of a recycled thermoplastic material.

Clause 3. The flexible button according to clause 2, wherein the flexible button is comprised of about 60% of the recycled thermoplastic material and about 40% of a non-recycled thermoplastic material.

Clause 4. The flexible button according to any one of clauses 2 through 3, wherein the recycled thermoplastic material is a recycled thermoplastic polyurethane material.

Clause 5. The flexible button according to clause 4, wherein the flexible button is comprised of about 60% of the recycled thermoplastic polyurethane material and about 40% of a non-recycled thermoplastic polyurethane material.

Clause 6. The flexible button according to any of clauses 1 through 5, wherein the perimeter portion comprises one or more voided portions spaced apart from the peripheral edge of the perimeter portion.

Clause 7. The flexible button according to any of clauses 1 through 6, wherein the flexible button comprises four voided portions.

Clause 8. The flexible button according to any of clauses 1 through 7, wherein the flexible button comprises a disc shape.

Clause 9. The flexible button according to any of clauses 1 through 8, wherein a diameter of the flexible button is from about 10 mm to about 25 mm, and wherein a third thickness of a thickest portion of the flexible button is from about 1 mm to about 2 mm.

Clause 10. The flexible button according to any of clauses 1 through 9, wherein the flexible button comprises a first surface and a second surface opposite the first surface, and wherein one or more of the first surface and the second surface are concave at the central portion of the flexible button.

Clause 11. The flexible button according to any one of clauses 1 through 9, wherein the flexible button comprises a first surface and a second surface opposite the first surface, and wherein one or more of the first surface and the second surface are flat at the central portion of the flexible button.

Clause 12. The flexible button according to any one of clauses 1 through 9, wherein the flexible button comprises a first surface and a second surface opposite the first surface, wherein the first surface is concave at the central portion of the flexible button and the second surface is flat at the central portion of the flexible button.

Clause 13. The flexible button according to any one of clauses 1 through 12, wherein the central portion and the perimeter portion comprise a disc shape.

Clause 14. An upper-body garment comprising: a torso portion; and a flexible button affixed to the torso portion, the flexible button comprising: a central portion having two or more threading openings and a first thickness; a perimeter portion continuously extending from the central portion, wherein a peripheral edge of the perimeter portion is tapered such that a second thickness of the peripheral edge is less than the first thickness of the central portion; and one or more voided portions spaced from the peripheral edge of the perimeter portion.

Clause 15. The upper-body garment according to clause 14, wherein the flexible button comprises a Shore A durometer hardness value from about 80 to about 100.

Clause 16. The upper-body garment according to any one of clauses 14 through 15, wherein the flexible button comprises at least 50% of a recycled thermoplastic material.

Clause 17. The upper-body garment according to clause 16, wherein the flexible button is comprised of about 60% of the recycled thermoplastic material and about 40% of a non-recycled thermoplastic material.

Clause 18. The upper-body garment according to any one of clauses 16 through 17, wherein the recycled thermoplastic material is a recycled thermoplastic polyurethane material.

Clause 19. The upper-body garment according to clause 18, wherein the flexible button is comprised of about 60% of the recycled thermoplastic polyurethane material and about 40% of a non-recycled thermoplastic polyurethane material.

Clause 20. A method for manufacturing a flexible button, comprising: preparing a mixture comprising at least 50% of a recycled thermoplastic material; and forming the flexible button from the mixture, the flexible button comprising: a central portion having two or more threading openings and a first thickness; and a perimeter portion continuously extending from the central portion, wherein a peripheral edge of the perimeter portion is tapered such that a second thickness of the peripheral edge is less than the first thickness of the central portion, wherein the flexible button comprises a Shore A durometer hardness value from about 80 to about 100.

Clause 21. The method according to clause 20, wherein forming the flexible button comprises one of molding, or a rapid manufacturing technique.

Clause 22. The method according to clause 21, wherein the rapid manufacturing technique includes one or more of laser sintering and 3D printing.

Clause 23. The method according to any one of clauses 20 through 22, wherein the flexible button is comprised of about 60% of the recycled thermoplastic material and about 40% of a non-recycled thermoplastic material.

Clause 22. The method according to any one of clauses 20 through 23, wherein the recycled thermoplastic material is a recycled thermoplastic polyurethane material.

Clause 23. The method according to clause 22, wherein the flexible button is comprised of about 60% of the recycled thermoplastic polyurethane material and about 40% of a non-recycled thermoplastic polyurethane material.

BRIEF DESCRIPTION OF THE SEVERAL VIEWS OF THE DRAWINGS

Aspects herein are described in detail below with reference to the attached drawing figures, wherein.

DETAILED DESCRIPTION

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Traditionally, buttons are made of a rigid plastic material having a predetermined, uniform overall thickness and lack apertures or voids except for, in some instances, holes used to stitch the button to an article of apparel. The rigid nature of the buttons makes them more likely to tear off when exposed to shearing forces, such as when sliding along the ground (e.g., in softball, baseball, soccer, and other such sports) and/or contacting other players. Rigid buttons may also lead to discomfort when positioned under the weight of the wearer, such as when sliding and/or sitting for extended periods of time. Additionally, the lack of apertures or voids contributes to increased weight of the button and may restrict breathability features of the underlying textile. Thus, a more flexible, lighter weight button with apertures or voids may provide more comfort to the wearer and may be more resilient than a traditional, rigid button.

A flexible button for use in athletic garments such as, for example, baseball and/or softball uniforms, is disclosed herein. The flexible button has the ability to flex in response to an applied force such as a shearing force, such that the likelihood of the flexible button breaking and/or tearing off of the textile to which it is attached is reduced.

The flexible button is tapered such the center of the button is thicker than the edges of the button. For example, as shown in the figures and as discussed in greater detail below, the flexible button may have a disc-like or circular shape with a tapered edge. In other words, the flexible button includes a side profile with a tapered edge that becomes gradually thinner moving from the center of the button toward the edge of the button. This results in a reduced profile that improves grip-ability of the button by providing feedback to the wearer while buttoning, increases flexibility of the button, and increases ease of buttoning by allowing the flexible button to slip through a button hole more easily than a traditional button having blunt, non-tapered edges.

The flexible button also includes a variety of apertures and voids. For example, in accordance with aspects herein, the button has a central portion having two or more threading openings, and a perimeter portion having one or more voided portions. The two or more threading openings are sized to allow a threaded needle to pass through but are small enough to ensure that, when threaded, the flexible button is tightly secured to the textile to which it is attached. The one or more voided portions located at the perimeter portion are generally elongate in shape to maximize the size or surface area of the resulting opening(s), thereby effectively reducing material weight of the button, increasing flexibility and pliability of the button, and ensuring that a smaller area of the underlying textile is fully covered by the button when compared to a traditional button of the same size. This allows for the textile to have a greater uncovered surface area, resulting in increased breathability (i.e., increased air transfer or moisture vapor transfer therethrough).

The term "article of apparel" as used herein is meant to encompass a number of different configurations adapted to cover a body of a wearer when the article of apparel is worn. For example, the configurations may include upper-body garments, lower-body garments, socks, footwear (i.e., shoes, boots, sandals, and the like), gloves, hats, masks, body suits, dresses, jumpers, overalls, and the like. The term "upper-body garment" as used herein is meant to encompass a number of different configurations adapted to cover an upper torso area of a wearer when the upper-body garment is worn. The configurations may include a jacket or coat, a pullover, a hoodie, a vest, a shirt, a uniform, a t-shirt, a jersey, and the like. The term "lower-body garment" as used herein is meant to encompass a number of different configurations adapted to cover a lower body area of a wearer when the garment is worn. The configurations may include, short pants, long pants, capri pants, jeans, trousers, skirts, skorts, leggings, tights, and the like. Positional or directional terms used to describe the upper-body garment such as front, back, internal, external, upper, lower, center, medial, lateral, anterior, posterior, and the like refer to the garment being worn as intended by a wearer standing upright. Thus, for example, the term "front" means configured to cover a front torso area of a wearer, and the term "back" means configured to cover a back torso area of a wearer. The term "textile" as used herein means any type of pliable cloth or fabric that is woven, non-woven, knit, braided, or the like, that can be used to produce, for example, articles of apparel such as the upper-body garment in accordance with aspects herein.

The term "flexible" when referring to the button in accordance with aspects herein means that the body of the button is bendable or pliable enabling the button to temporarily deform in a direction consistent with a force being applied to it. Once the applied force is removed, the button returns to its original or in other words, resting state. The term "peripheral edge" refers to the outermost edge of the button where both side surfaces (i.e., front and back sides) of the button converge.

Unless indicated otherwise, all measurements provided herein are taken when the button is at standard ambient temperature and pressure (298.15 K and 100 kPa) and the button is in a resting state (i.e., not bent).

Figure 1:
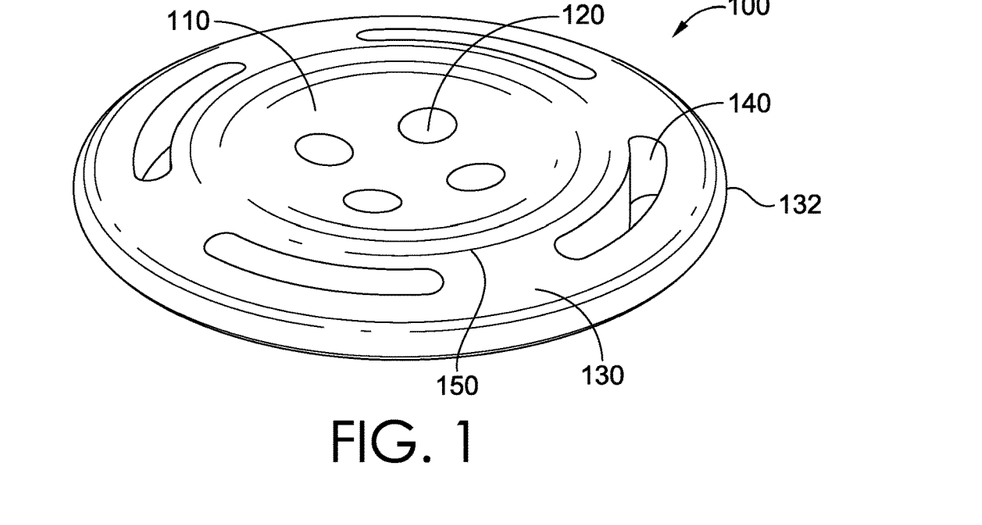
FIG. 1 depicts a perspective view of a flexible button in accordance with aspects herein.
Figure 2:
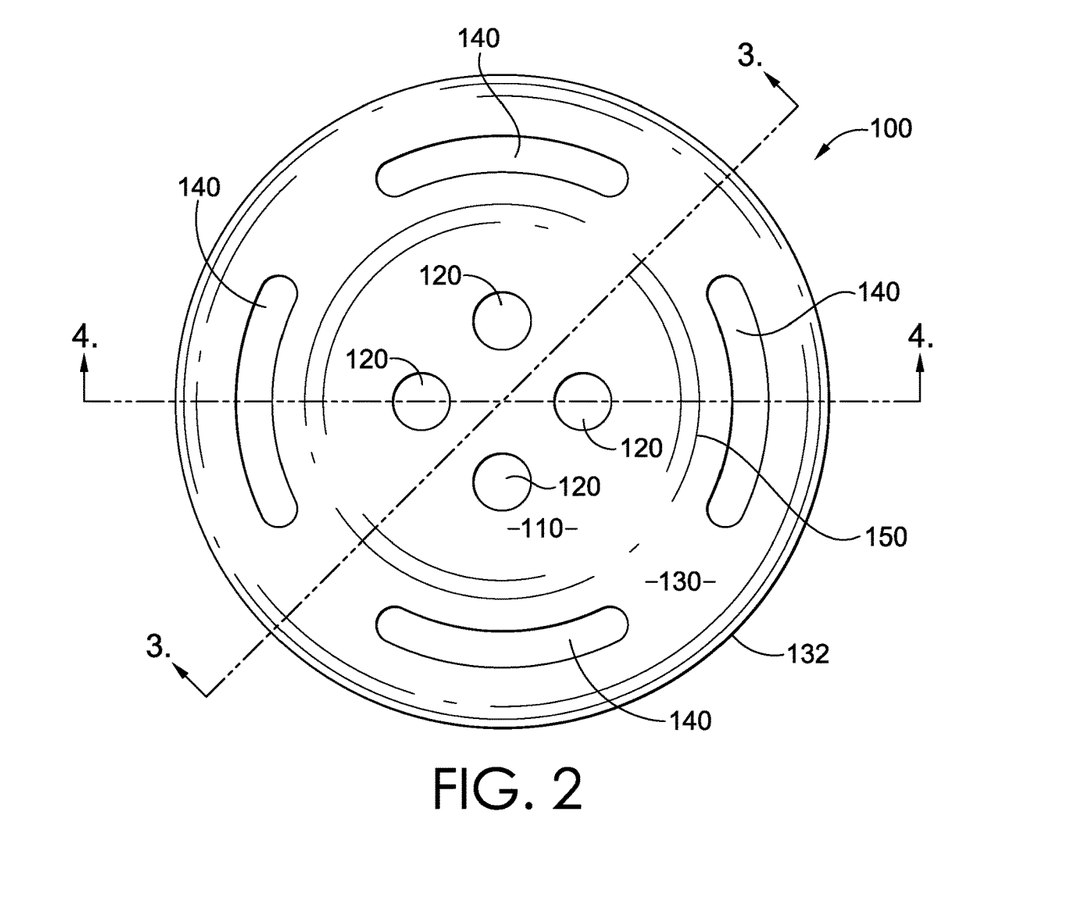
FIG. 2 depicts a top-down view of the flexible button of FIG. 1 in accordance with aspects herein.

FIG. 1 and FIG. 2 depict a perspective view and a top-down view of flexible button 100, respectively, in accordance with aspects herein. As depicted, the flexible button 100 comprises a central portion 110 having two or more threading openings 120 and a perimeter portion 130 having one or more voided portions 140. In some aspects, the perimeter portion 130 of the flexible button 100 may include four voided portions 140, as shown, three voided portions 140, two voided portions 140, or any number of voided portions 140, as desired. The one or more voided portions 140 are spaced inwardly from a peripheral edge 132 of the perimeter portion 130 and are generally elongate in shape, as shown. However, the voided portions 140 may be any suitable shape as desired. In some aspects, the shape of the voided portions 140 may depend on the number of voided portions 140 in the flexible button 100. For example, the arc length 142 (as shown in FIG. 2) of the voided portions 140 may decrease as the number of voided portions 140 increases. Conversely, the arc length 142 may increase as the number of voided portions 140 decreases. The voided portions 140 may improve the flexibility of the flexible button 100, particularly at the perimeter portion 130 by reducing an overall amount of material. In some aspects, the one or more voided portions 140 may be evenly distributed around the perimeter portion 130. However, it is contemplated herein that the one or more voided portions 140 may also be unevenly distributed around the perimeter portion 130 of the flexible button 100 as desired. Selective distribution of the voided portions 140 may allow for customizable flexibility, weight, and/or breathability of the flexible button 100 and may depend on the desired application and/or preferences of the wearer.

Figure 3:
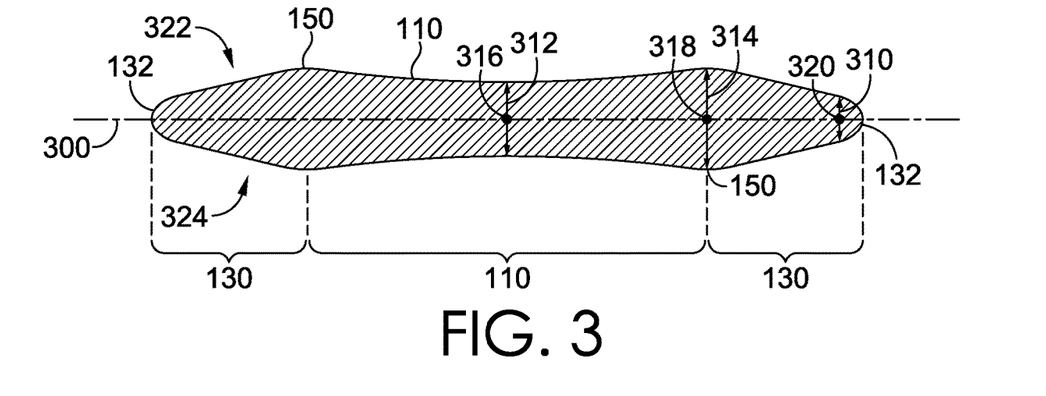
FIG. 3 depicts a cross-sectional view of the flexible button taken through the line 3-3 shown in FIG. 2 in accordance with aspects herein.

As shown in FIGS. 1 and 2, the central portion 110 transitions to the perimeter portion 130 at a transitional boundary 150 from which the perimeter portion 130 begins to taper towards the peripheral edge 132, as is more apparent in FIG. 3. In some aspects, the central portion 110 includes a concave surface. Thus, the transitional boundary 150 is the thickest part of the flexible button 100. In some aspects, the transitional boundary 150 may be a distinct line demarcating transition of the central portion 110 to the perimeter portion 130. However, in other aspects, the transitional boundary 150 may be a hypothetical boundary.

FIG. 3 is a cross-section of the flexible button 100 taken at line 3-3 of FIG. 2. As shown, the peripheral edge 132 of the perimeter portion 130 of the flexible button 100 is tapered such that a thickness 310 of the peripheral edge 132 is less than a thickness 312 located at the center of the central portion 110. As described herein the thickness 310 of the peripheral edge 132 is also less than a thickness 314 located at the transitional boundary 150. In other words, the flexible button 100 is thickest at the transitional boundary 150 and thinnest at the peripheral edge 132. The tapering of the perimeter portion 130 of the flexible button 100, in addition to reducing the overall weight of the flexible button 100, improves the grip-ability of the flexible button 100 by a wearer and improves the ability of the flexible button 100 to slide in and out of a respective button hole such that buttoning and unbuttoning the garment is easier and quicker.

In some aspects, the flexible button 100 is symmetrical with respect to a bisecting plane 300 passing through a midpoint 320 of the thickness 310 proximal to the peripheral edge 132, a midpoint 318 of the thickness 314 located at the transitional boundary 150, and a midpoint 316 of the thickness 312 located at the center of the central portion 110. In other words, a first surface contour 322 of the flexible button 100 is a mirror image of a second surface contour 324 of the flexible button 100.

It is contemplated herein that the central portion 110 includes a first concave surface that forms, at least in part, the first surface contour 322 and a second opposite concave surface that forms, at least in part, the second surface contour 324. In other words, the flexible button 100 includes a concave surface at the central portion 110 on both surfaces of the flexible button 100, as shown. These opposing concave surfaces further reduce the material weight of the flexible button 100 and may further improve flexibility. Although not shown, in other aspects, it is also contemplated that the flexible button 100 may not be symmetrical with respect to the bisecting plane 300. For example, one of the first surface contour 322 or the second surface contour 324 may be a flat surface (e.g., having no surface contours). In other words, one of the first surface contour 322 or the second surface contour 324 may be parallel to the bisecting plane 300 such that, when attached to a textile, the flexible button 100 sits flush against the textile. In other aspects, only the central portion 110 of the first surface contour 322 or the second surface contour 324 may have a flat surface, resulting in only the central portion 110 being flush with the textile to which the flexible button 100 is attached.

Figure 4:
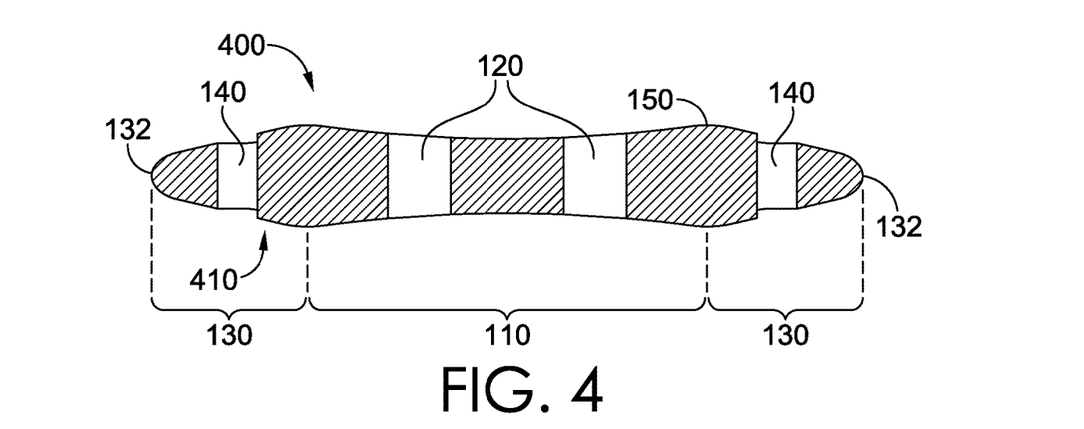
FIG. 4 depicts a cross-sectional view of the flexible button taken through the line 4-4 shown in FIG. 2 in accordance with aspects herein.

FIG. 4 depicts a cross-sectional view of the flexible button 100 taken through the line 4-4 of FIG. 2. As shown, the threading openings 120 located in the central portion 110 and the one or more voided portions 140 extend completely through the flexible button 100. In other words, the threading openings 120 and the one or more voided portions 140 extend from a first surface 400 through to a second surface 410. As shown, the flexible button 100 is generally disc-shaped (i.e., generally round and/or circular and flat and cylindrically shaped) and has a javelin-shaped cross-section (i.e., based on the tapering effect of the perimeter portion 130). In other words, the cross-section of the flexible button 100 taken through any point on the first surface 400 or the second surface 410, has an elongated shape formed by the central portion 110 and the perimeter portion 130 tapering to the peripheral edge 132. Although not shown, it is also contemplated that the flexible button 100, in accordance with aspects herein, may comprise a shape other than a disc. For example, the flexible button 100 may be square shaped, oval shaped, diamond shaped, or any other suitable shape as desired.

Further, the flexible button 100 may be sized according to the desired application for the flexible button 100. For example, the flexible button 100 may have a diameter from about 10 mm to about 25 mm, from about 12 mm to about 20 mm, from about 15 mm to about 18 mm, and the like, wherein the term "about" indicates a deviation of ±0.5 mm. At its thickest point depicted as the transitional boundary 150, where the central portion 110 transitions into the perimeter portion 130, the flexible button 100, in accordance with aspects herein, may have a thickness 314 from about 1 mm to about 3 mm, from about 1.2 mm to about 2.6 mm, from about 1.5 mm to about 2.3 mm, or from about 1 mm to about 2 mm, wherein the term "about" indicates a deviation of ±0.2 mm.

Figure 5:
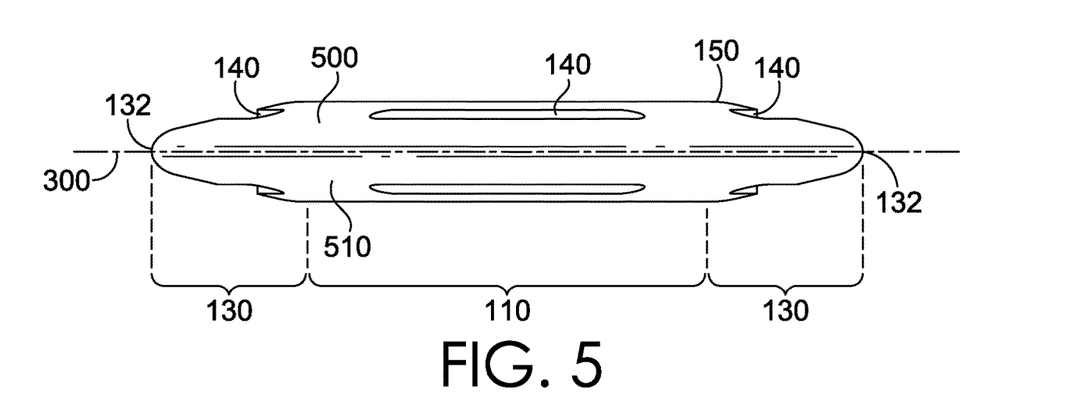
FIG. 5 depicts a side profile view of the flexible button of FIG. 1 in accordance with aspects herein.

FIG. 5 depicts a side view of the flexible button 100. As shown, the perimeter portion 130 includes a first sloping surface 500 that slopes toward the bisecting plane 300 in a first direction and a second sloping surface 510 opposite the first sloping surface 500 that slopes toward the bisecting plane 300 in a second direction that is opposite to the first direction. The first sloping surface 500 and the second sloping surface 510 intersect at the bisecting plane 300, thereby forming a sharp edge at the peripheral edge 132. However, although not shown, it is also contemplated that the flexible button 100 may comprise a perimeter portion 130 having a flat surface that is parallel to the bisecting plane 300 on one side and a sloped surface on the opposite side. In such a case, the peripheral edge 132 of the perimeter portion 130 having the flat surface would be, for example, level with the transitional boundary 150.

The flexible button 100, in accordance with aspects herein, is also formed of at least 50% of a recycled thermoplastic material such as a recycled thermoplastic polyurethane (TPU) material. The recycled TPU material may be recycled from a variety of different sources including, for example, worn articles of footwear or apparel, device accessories, and the like. This reduces the carbon ($CO_2$) footprint of the flexible button 100 during the manufacturing process. In some aspects, the flexible button 100 includes, for example, at least about 53%, at least about 55%, at least about 57%, at least about 60%, at least about 63%, at least about 65%, at least about 67%, at least about 70%, at least about 73%, at least about 75%, at least about 77%, at least about 80%, at least about 83%, at least about 85%, at least about 87%, at least about 90%, at least about 93%, at least about 95%, or at least about 97% of a recycled thermoplastic material combined with a respective percentage of a non-recycled thermoplastic material such as, for example, a non-recycled thermoplastic polyurethane (TPU) material (e.g., 60% recycled TPU and 40% non-recycled TPU), where the term about indicates a deviation of ±0.2%. In yet other aspects, the flexible button 100 may include 100% of a recycled thermoplastic material. Other suitable materials for forming the flexible button 100 may include, for example, silicone, nylon, polyethylene, and the like, and any suitable combination of materials that would yield the flexible button 100 having a desired flexibility (i.e., bendability) and hardness.

For instance, the flexible button 100, in accordance with aspects herein, may have a Shore A durometer hardness value from about 80 to about 100. In other aspects, the Shore A durometer hardness may be from about 83.1 to about 98.9, from about 85 to about 98, from about 87.1 to about 96.9, from about 89 to about 96, from about 90.2 to about 94.9, or from about 92.1 to about 94, wherein the term "about" indicates a deviation of ±0.2.

Figure 6A:
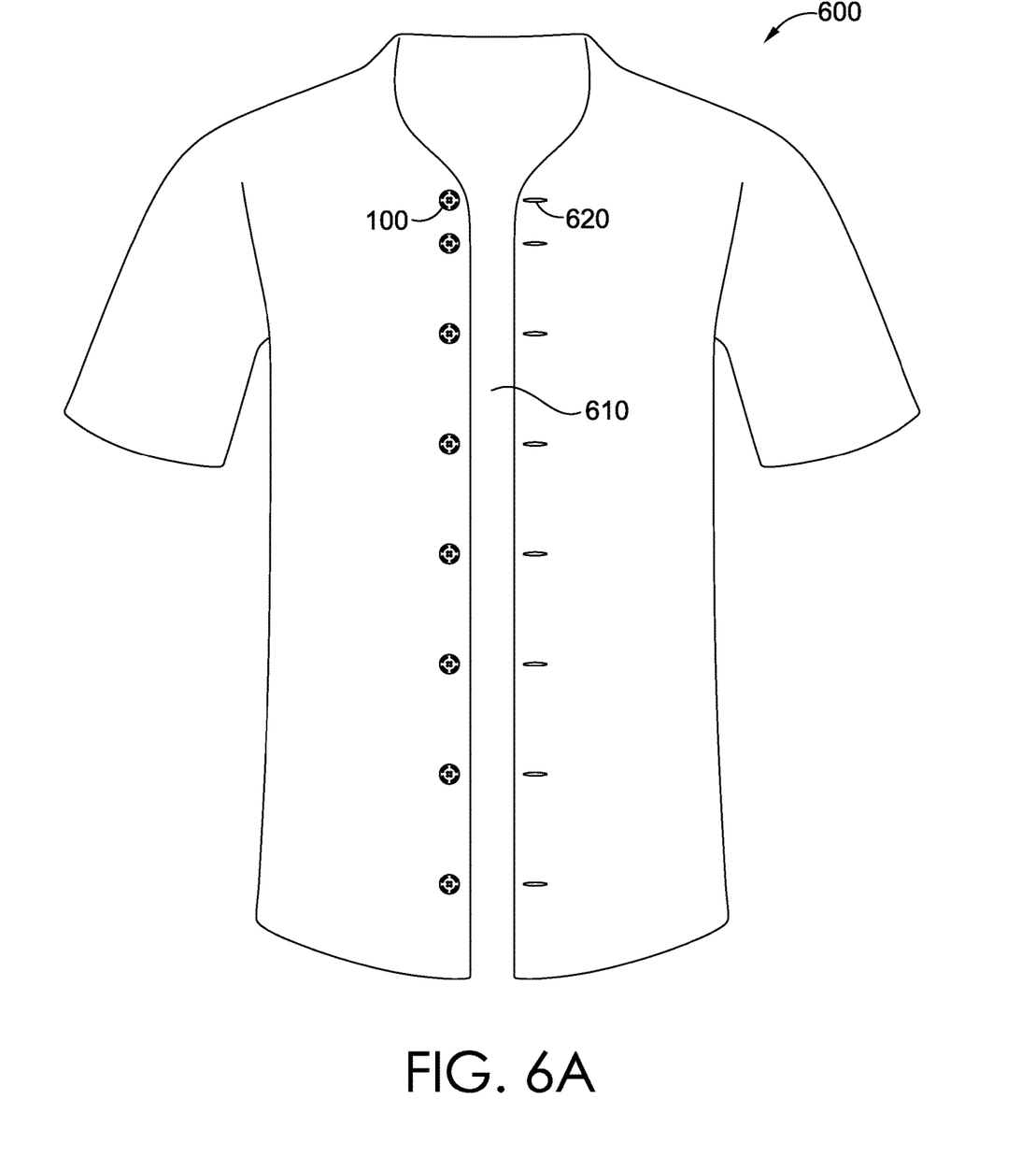
FIG. 6A depicts a garment with a front closure opened, wherein the front closure is closeable with a plurality of flexible buttons in accordance with aspects herein.
Figure 6B:
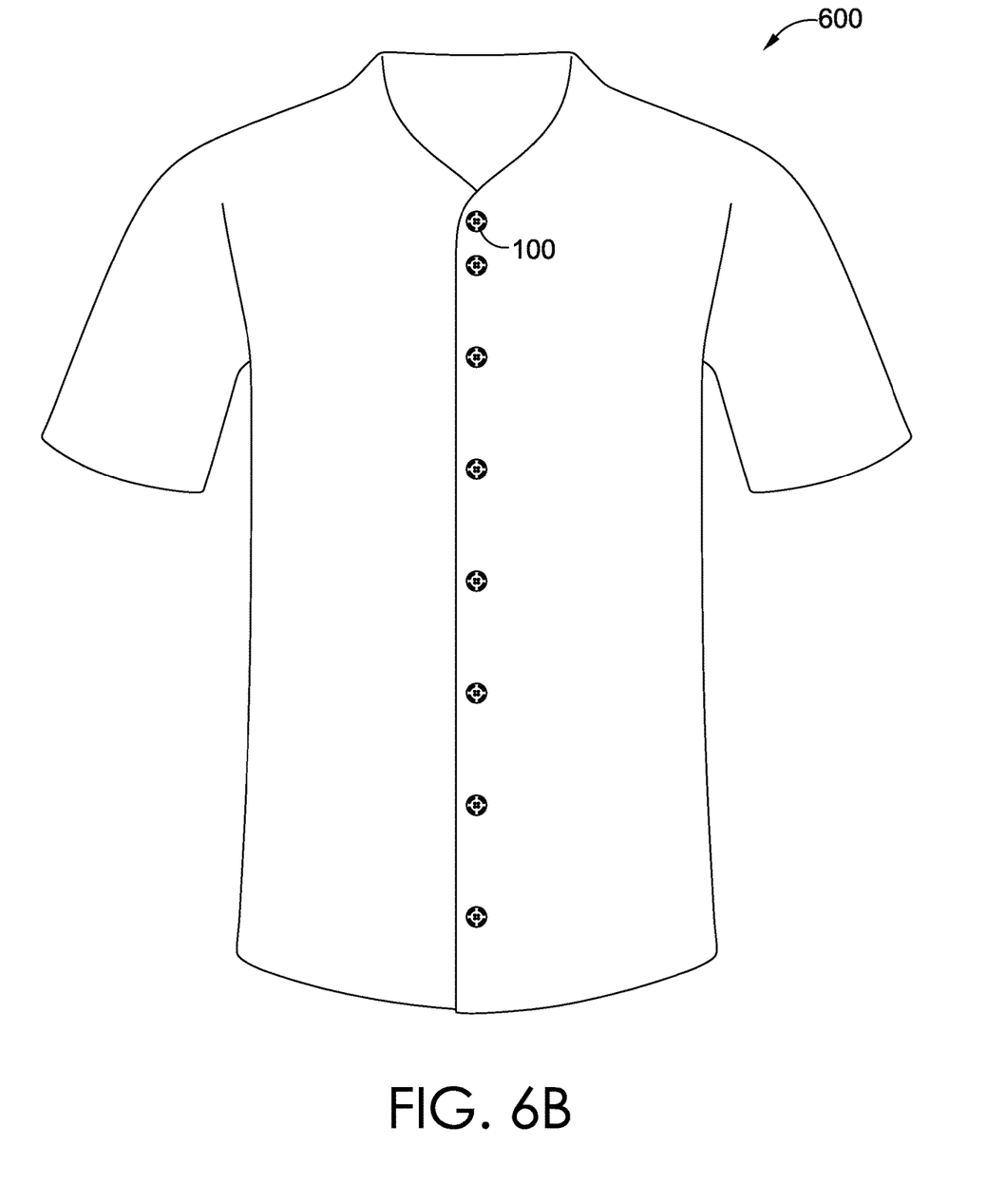
FIG. 6B depicts a garment with the front closure closed with the plurality of flexible buttons in accordance with aspects herein.

FIG. 6A discloses a garment 600. The garment 600 may be an upper body garment (as shown) or a lower body garment. The garment 600 may be a shirt-type garment having a front closure 610 that is closeable with a plurality of flexible button(s) 100 by inserting the each of the flexible buttons 100 through a plurality of corresponding button opening(s) or button holes 620, as shown in FIG. 6B. In one example aspect, the garment 600 may be an athletic jersey for use in sports such as baseball or softball.

Figure 7:
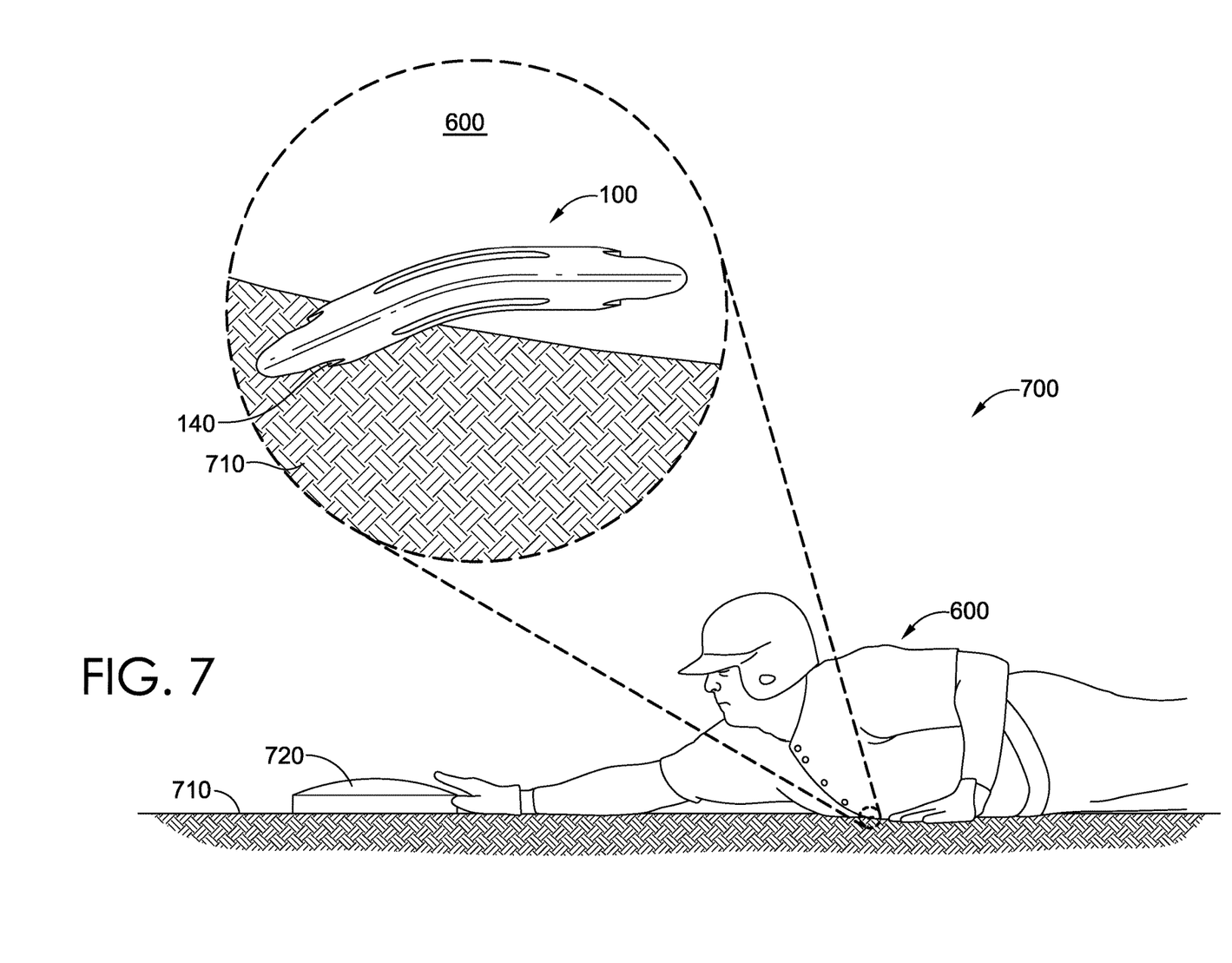
FIG. 7 depicts an action image of a wearer wearing a garment having a plurality of flexible buttons when the wearer is actively engaged in an activity in accordance with aspects herein.

FIG. 7 depicts an action image of a baseball player 700, for example, wearing the garment 600. In the action image, the baseball player 700 is sliding into base 720. As shown in the close-up view of one of the flexible buttons 100 located proximal to a ground surface 710, the flexible button 100 is flexing which allows the flexible button 100 to absorb or dissipate some of the forces experienced by the flexible button 100 when the baseball player 700 is sliding into base 720. The ability of the flexible button 100 to flex may help prevent the flexible button 100 from being torn off the garment 600 or breaking, as may happen with traditional buttons that are stiffer and more rigid. This feature is augmented by the low profile of the perimeter portion 130 of the flexible button 100 which presents a smaller surface area contacting the ground surface 710, which further reduces the chance of the flexible button 100 being torn off of the garment 600. For example, the flexible button 100, in accordance with aspects herein, may have a pull strength from about 9 kg to about 25 kg, where pull strength is measured as the force needed to detach the flexible button 100 from the textile to which it is attached. In other aspects, the pull strength may be from about 9.5 kg to about 24.5 kg, from about 11 kg to about 23.5 kg, from about 13 kg to about 23 kg, from about 15.5 kg to about 21.5 kg, or from about 17 kg to about 19 kg, where the term "about" indicates a deviation of ±0.5 kg. Additionally, the flexible nature of the flexible button 100 along with its unique shape may reduce discomfort experienced by the baseball player 700 when sliding (such as into base 720).

Figure 8:
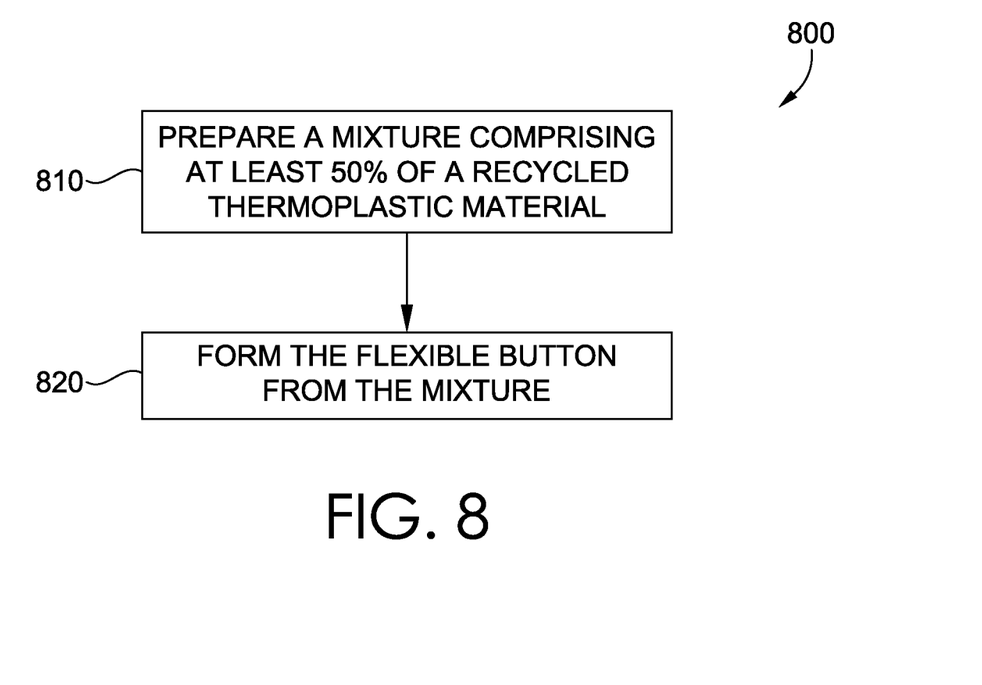
FIG. 8 depicts a flow diagram for a method of manufacturing the flexible button of FIG. 1 in accordance with aspects herein.

FIG. 8 depicts a method 800 for manufacturing the flexible button 100. The method 800 includes the steps of preparing a mixture comprising at least 50% of a recycled thermoplastic material, as shown at step 810, and forming the flexible button 100 from the mixture, as shown at step 820. A suitable manufacturing technique for forming the flexible button 100 from the mixture may include, for example, molding. Other suitable techniques may include rapid manufacturing techniques including, for example, laser sintering, 3D printing, and the like.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated

Having thus described the invention, what is claimed is:

1. A flexible button comprising:
   a central portion having two or more threading openings and a first thickness; and
   a perimeter portion continuously extending from the central portion, wherein a peripheral edge of the perimeter portion is tapered such that a second thickness of the peripheral edge is less than the first thickness of the central portion, and wherein the flexible button comprises a Shore A durometer hardness value from about 80 to about 100; and
   one or more voided portions in the perimeter portion, wherein the one or more voided portions are spaced apart from the peripheral edge of the perimeter portion, and wherein the one or more voided portions extend completely through the flexible button.

2. The flexible button of claim 1, wherein the flexible button comprises at least 50% of a recycled thermoplastic material.

3. The flexible button of claim 2, wherein the recycled thermoplastic material is a recycled thermoplastic polyurethane material.

4. The flexible button of claim 3, wherein the flexible button is comprised of about 60% of the recycled thermoplastic polyurethane material and about 40% of a non-recycled thermoplastic polyurethane material.

5. The flexible button of claim 1, wherein the one or more voided portions have an elongated shape.

6. The flexible button of claim 1, wherein the flexible button comprises four voided portions.

7. The flexible button of claim 1, wherein the flexible button comprises a circular shape.

8. The flexible button of claim 1, wherein a diameter of the flexible button is from about 10 mm to about 25 mm, and wherein a third thickness of a thickest portion of the flexible button is from about 1 mm to about 2 mm.

9. The flexible button of claim 1, wherein the flexible button comprises a first surface and a second surface opposite the first surface, and wherein one or more of the first surface and the second surface are concave at the central portion of the flexible button.

10. The flexible button of claim 1, wherein the flexible button comprises a first surface and a second surface opposite the first surface, and wherein one or more of the first surface and the second surface are flat at the central portion of the flexible button.

11. The flexible button of claim 1, wherein the flexible button comprises a first surface and a second surface opposite the first surface, wherein the first surface is concave at the central portion of the flexible button and the second surface is flat at the central portion of the flexible button.

12. An upper-body garment comprising:
    a torso portion; and
    a flexible button affixed to the torso portion, the flexible button comprising a Shore A durometer hardness value from about 80 to about 100:
    a central portion having two or more threading openings and a first thickness;
    a perimeter portion continuously extending from the central portion, wherein a peripheral edge of the perimeter portion is tapered such that a second thickness of the peripheral edge is less than the first thickness of the central portion; and
    one or more voided portions spaced from the peripheral edge of the perimeter portion, wherein the one or more voided portions extend completely through the flexible button.

13. The upper-body garment of claim 12, wherein the one or more voided portions have an elongated shape.

14. The upper-body garment of claim 12, wherein the flexible button comprises at least 50% of a recycled thermoplastic material.

15. The upper-body garment of claim 14, wherein the flexible button is comprised of about 60% of the recycled thermoplastic material and about 40% of a non-recycled thermoplastic material.

16. A method for manufacturing a flexible button, comprising:
    preparing a mixture comprising at least 50% of a recycled thermoplastic material; and
    forming the flexible button from the mixture, the flexible button comprising:
    a central portion having two or more threading openings and a first thickness; and
    a perimeter portion continuously extending from the central portion, wherein a peripheral edge of the perimeter portion is tapered such that a second thickness of the peripheral edge is less than the first thickness of the central portion, wherein the flexible button comprises a Shore A durometer hardness value from about 80 to about 100; and
    one or more voided portions in the perimeter portion, wherein the one or more voided portions are spaced apart from the peripheral edge of the perimeter portion, and wherein the one or more voided portions extend completely through the flexible button.

17. The method of claim 16, wherein forming the flexible button comprises one of molding, or a rapid manufacturing technique.

18. The method of claim 17, wherein the rapid manufacturing technique includes one or more of laser sintering and 3D printing.

19. The method of claim 16, wherein the recycled thermoplastic material is a recycled thermoplastic polyurethane material.

20. The method of claim 19, wherein the flexible button is comprised of about 60% of the recycled thermoplastic polyurethane material and about 40% of a non-recycled thermoplastic polyurethane material.

\* \* \* \* \*